Feb. 28, 1933. J. TEKAVEC 1,899,598
VALVE RESEATING TOOL
Filed June 13, 1930 2 Sheets-Sheet 1

Inventor
JOHN TEKAVEC
BY A. P. Lawler
ATTORNEY

Fig.7. 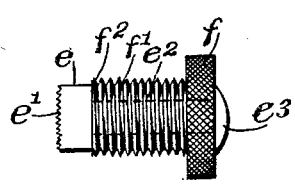 Fig.8. 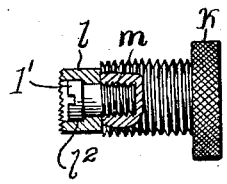 Fig.9. 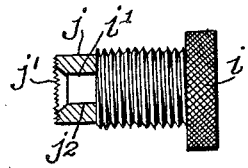
Fig.14. 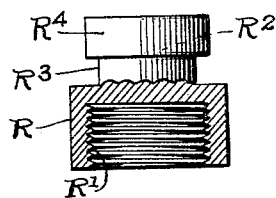 Fig.15. 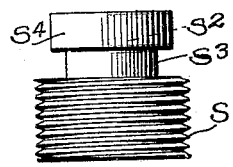 Fig.16. 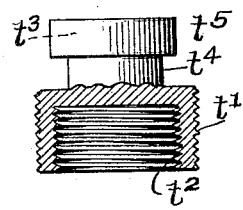
Fig.10. 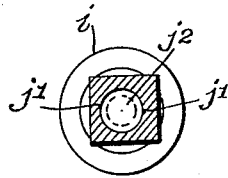 Fig.11. 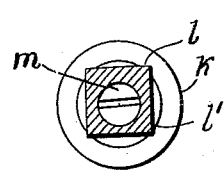 Fig.12. 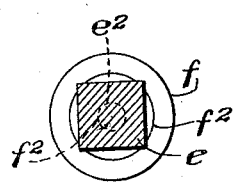
Fig.17.
Fig.13. 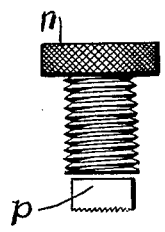 Fig.18. 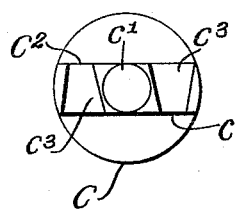 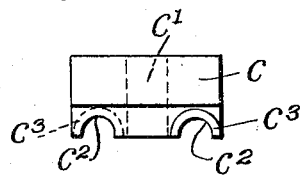
Inventor
JOHN TEKAVEC
BY A. P. Lawler
ATTORNEY Patented Feb. 28, 1933

1,899,598

UNITED STATES PATENT OFFICE

JOHN TEKAVEC, OF CLEVELAND, OHIO

VALVE RESEATING TOOL

Application filed June 13, 1930. Serial No. 460,921.

This invention relates broadly to valve reseating devices, and more particular to a valve reseating device having an easily regulable feeding device, and a removably mounted adapting device.

The principal object of the invention is to provide a novel coupling or connecting means between a supporting member and an adapting device, and also to provide means whereby the tool carrying member may be regulated conveniently and efficiently.

The foregoing and other objects, together with their attendant advantages, will be apparent as the device becomes better understood by reference to the accompanying specification and drawings forming a part thereof, it being premised that changes may be made in the various details of construction within the scope of the appended claim, without departing from the spirit of the invention.

Like reference letters indicate like parts throughout the drawings.

Figure 6 is a side view of a supporting member showing its construction.

Figure 7 is an enlarged view of a manipulating member with a clamping member mounted therein.

Figure 8 is an enlarged view of a modified form of a manipulating member, a clamping member being screwed to the member by a screw.

Figure 10 is an end view of Fig. 9.

Figure 11 is an end view of Fig. 8.

Figure 12 is an end view of Fig. 7.

Figure 13 is an enlarged view of another form of a manipulating member, a clamping member being detached from the member.

Figure 14 is a modified form of an adapter, parts being broken away, and showing in section its construction.

Figure 15 is a side view of another form of a modified form of an adapter, showing as being threaded on the outside.

Figure 16 is still another form, parts being broken away, and showing in section its construction, it being threaded in and out side.

Figure 17 is an enlarged view of the cutter shown in Fig. 1.

Figure 18 is a bottom view of the same showing its construction.

The device consists of an actuator $a$, and a removably mounted cutter $c$, on a threaded member $b$. The cutter $c$ is provided with a threaded bore $c^1$ and cutting members $c^2$.

A supporting member $d$ is provided with a bore $d^1$ threaded, a skirt $d^2$, having an internally projecting flange $d^3$, the skirt and flange having a portion $d^4$ removed therefrom forming a partial perimetrical flange and skirt to provide a U-shaped coupling, and also having a threaded bore $d^5$ with an interrupted or broken periphery as at $d^6$.

A member $e$ having a perimeter other than round is provided with a concaved threaded surface $e^1$ and an integral shaft member $e^2$. The threaded surface fits against a corresponding side of the threaded member. A manipulating member $f$ having a bore $f^1$, and a threaded periphery $f^2$ is rotatably mounted on the integral projecting portion of the member $e$ of the clamping member and the end is peened over as at $e^3$ to connect the units in operative relation. The clamping member is reciprocably mounted with respect to the supporting member.

An adapting device $g$ is provided with a threaded diverging threaded bore $g^1$, and with a smooth axial bore $g^2$ that snugly engages the threaded member $b$, an annular groove $g^3$, and a centering portion $g^4$.

An adapter $h$ is externally threaded as at $h^1$ and provided with an axial bore $h^2$, an annular groove $h^3$ and a centering portion $h^4$.

$i$ is a modified form of a manipulating member having an integral dowel $i^1$, having a member $j$ with a threaded surface $j^1$, and a bore $j^2$ mounted and secured thereon.

$k$ is another modification of a manipulating member, the member $l$ is provided with a threaded surface $l^1$, and a countersunk bore $l^2$, and secured to the manipulating member by a screw $m$.

$n$ is another modification of a manipulating member, the member $p$ is detached from the member $n$ and is preferably made of fiber or the like.

$o$ is a stop member threadedly engaging the member $b$.

Figure 1:
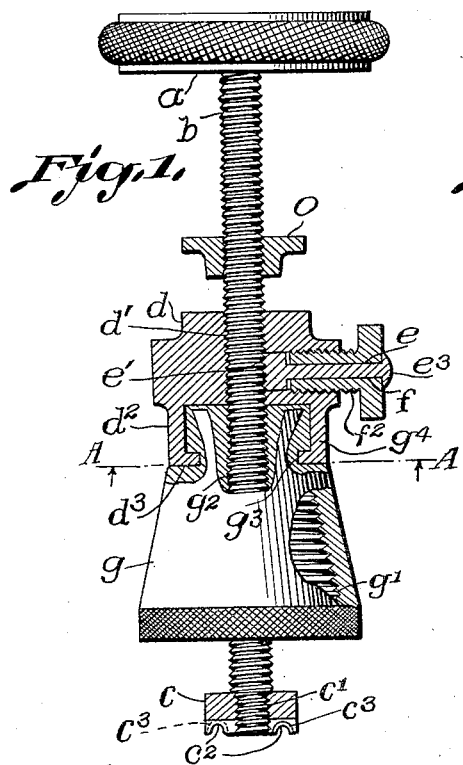
Figure 1 is a vertical sectional view, parts being broken away, of a valve reseater embodying the invention.
Figure 2:
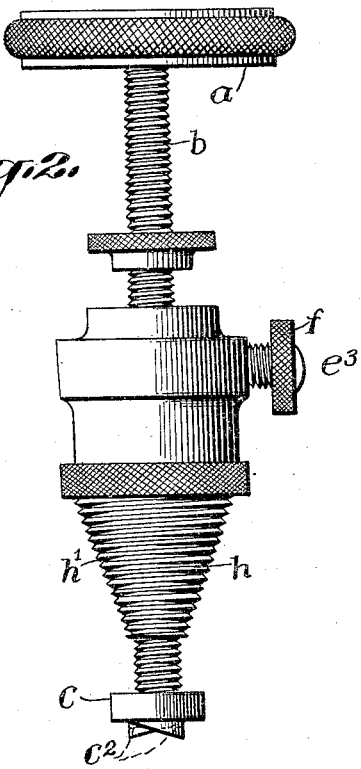
Figure 2 is a side view of a valve reseater having an adapting device of a truncated conical configuration mounted thereon.
Figure 3:
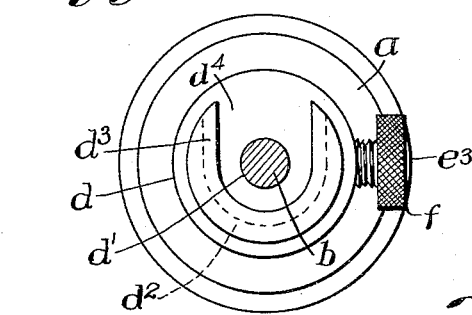
Figure 3 is a view on line A—A in Fig. 1 showing a coupling.
Figure 9:
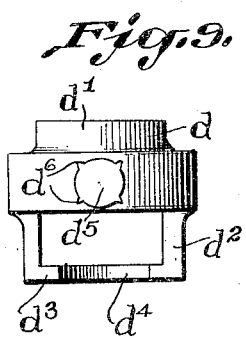
Figure 9 is an enlarged view of another modified form of a manipulating member having an integral dowel, a clamping member being secured on the dowel.
Figure 4:
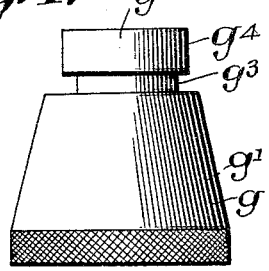
Figure 4 is a side view of the adapter shown in Fig. 1, detached from the device.
Figure 5:
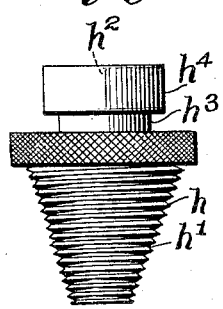
Figure 5 is a side view of the adapter shown in Fig. 2 detached from the device.

A cutter $c$ is provided with a plurality of cutting instrumentalities, of suitable configuration as semi-circular or parabolic and such like. The cutting edge is produced by sloping the metal to form the cutting edges as at $c^2$, see Fig. 1 and also enlarged views, Figs. 17 and 18.

The operation of the device is as follows:

The device is mounted on a faucet or valve requiring reseating, the manipulating member is released in the supporting member and when such is done it is obvious that when it is turned out it carries with it the element $e$. The tool shaft is then screwed down or up as the case may warrant. When the cutter is brought into cutting relation with the seat, the manipulating member is screwed to place in the supporting member, carrying with it the element $e$. The element then engages the threaded shaft by being carried endwise against the thread thereon, and the threaded surface engages the thread on the tool shaft and clamps the tool shaft in the supporting member $d$. The member $d$, being fixed in this way to the shaft, may be rotated on the adapter device. Should it become necessary to remove additional material from the valve seat, then the manipulating member is slightly released and the tool shaft or stem turned slightly downward. The member $e$, being in engagement with the tool stem, holds the operable member or tool shaft from slipping in the device. The manipulating member with its element not only holds the tool shaft locked in the device, but also, act as a device through which feeding may be and is accomplished.

It is obvious from the construction shown that the adapters are interchangeable with the member $d$ making the device a tool that may be used on either inside or outside threaded faucets, valves and the like.

The stop member is provided to prevent the tool body slipping along the operable member, when a smooth bore is used in the support. It is apparent, that if the tool was being used on a valve over head, and the manipulating member was screwed out sufficiently thereby allowing the body to slip on the tool shaft or operable member, it might possibly injure the hand between the actuator and the body of the tool.

The stop member is provided to eliminate the possibility of such injury.

R is a modified form of an adapting device having a cylindrical portion internally threaded as at $R^1$, a bore $R^2$, an annular groove $R^3$, and a centering or pendant portion $R^4$.

S is another modified form of an adapting device having a cylindrical portion threaded as at $S^1$, a bore $S^2$, an annular groove $S^3$, and a centering portion $S^4$.

$t$ is another modified form of an adapting device having a cylindrical portion internally and externally threaded as at $t^2$ and $t^1$, a bore $t^3$, an annular groove $t^4$ and a centering or pendant portion $t^5$.

It is evident that the modified forms shown in Figs. 14, 15 and 16, may be constructed to fit the standard faucets or valves now in the market, and thus minimize the cost of the tool construction.

The embodiment of the invention illustrated and described herein have been selected for the purpose of clearly setting forth the principles involved. It will be apparent, however, that the invention is susceptible of being modified to meet the different conditions encountered in its use and I therefore aim to cover by the appended claim all modifications within the true spirit and scope of my invention.

What I claim as new and desire to secure by Letters Patent of the United States is:—

A valve reseater having, in combination, a threaded tool stem, a support provided with a U-shaped coupling, the support being longitudinally bored and threaded, and having formed at right angles to the longitudinal bore a second threaded bore, the second bore having circumferential interruptions formed longitudinally therein, a clamp having a threaded face to conform to the contour of the threaded tool stem located in said second bore and having a periphery cooperating with the interruptions of the bore a screw in said second bore cooperating with the bore and the clamp so as to advance and withdraw the clamp, a threaded conical adapter having a smooth longitudinal bore adapted to receive and snugly engage the threaded tool stem, said adapter also having an annular groove formed in the upper end thereof adapted to cooperate with the U-shaped coupling so that the adapter is laterally slidable into the coupling and when positioned thereon, the longitudinal bore in the support and the bore in the adapter are in alignment.

JOHN TEKAVEC.